Feb. 25, 1969   R. F. SKELTON   3,430,011
AUGER CORNER WITH RELIEF AND SHUTOFF SWITCH
Filed Jan. 3, 1967
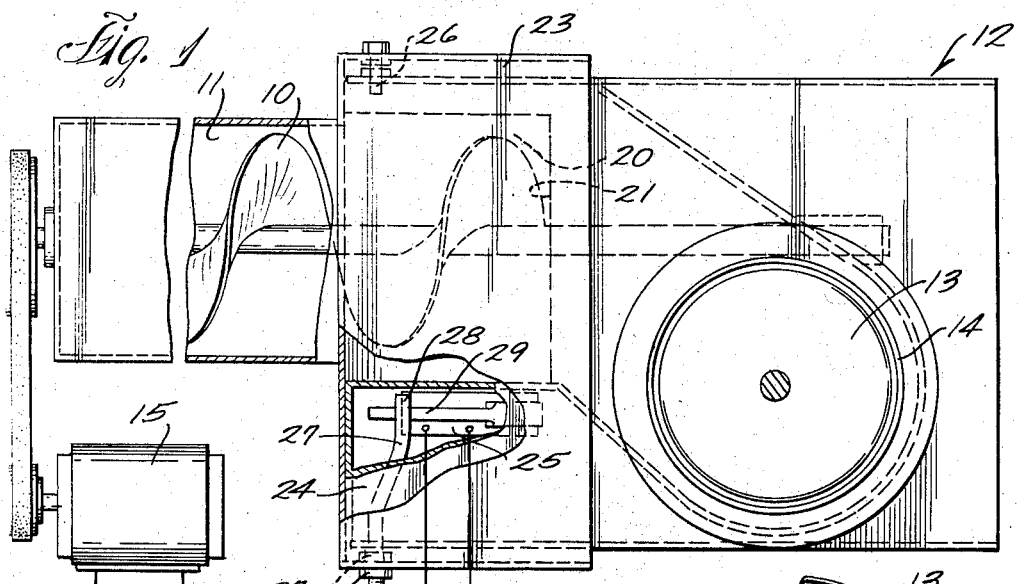
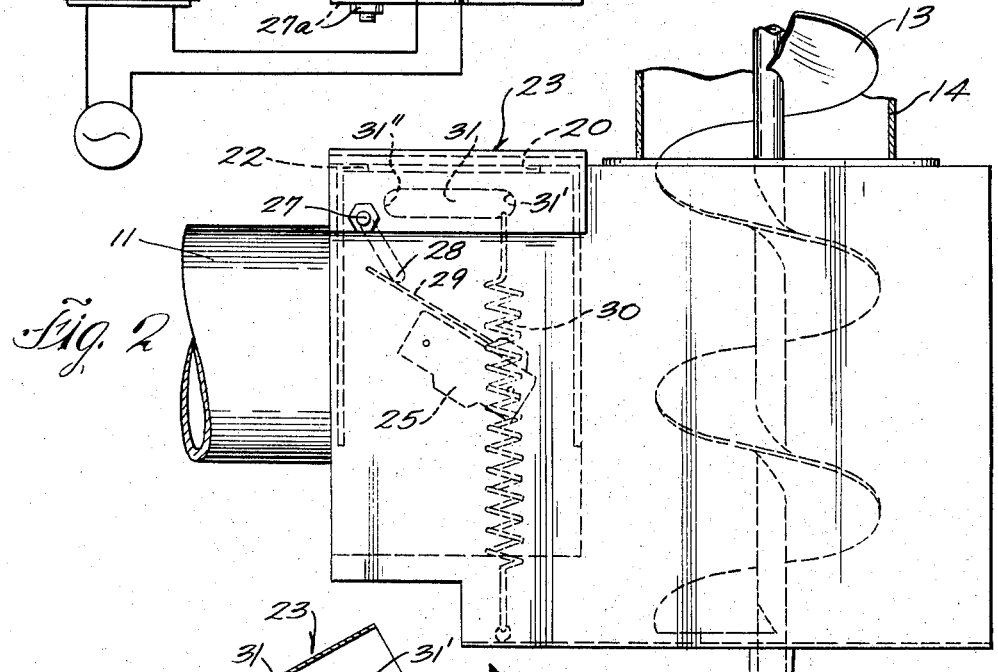
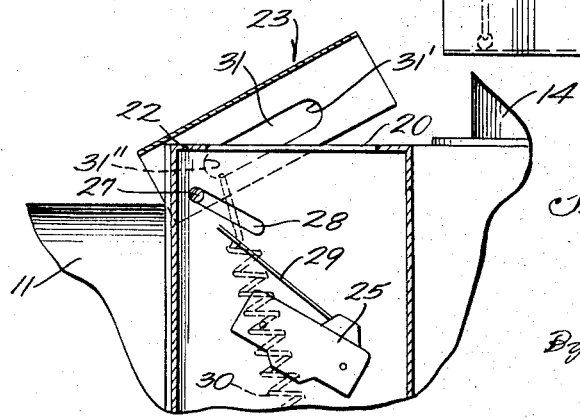
Inventor
Robert F. Skelton
By Wheeler, Wheeler, House & Clemency
Attorneys.

United States Patent Office 3,430,011
Patented Feb. 25, 1969

3,430,011
AUGER CORNER WITH RELIEF AND SHUTOFF SWITCH
Robert F. Skelton, Bluffton, Ind., assignor to Mix-Mill, Inc., Bluffton, Ind., a corporation of Indiana
Filed Jan. 3, 1967, Ser. No. 606,655
U.S. Cl. 200—61.21          5 Claims
Int. Cl. H01h 35/00, 3/16

ABSTRACT OF THE DISCLOSURE

A safety device for a location where two enclosed conveyors, such as augers, meet at an angle. The corner has a hinged cover, closed by a spring arranged to provide more force to hold the cover closed than to reclose it after opening. The cover hinge pin is bent to form a switch actuator for a motor switch. If material is not removed by the outgoing conveyor as fast as it is fed in by the incoming conveyor the pressure raises the cover. The hinge pin actuates the switch to shut down at least the incoming conveyor, and the cover remains open.

Background of the invention

An auger conveyor develops high pressures when the flow of the material conveyed is obstructed for any reason. When two conveyors meet at an angle, the obstruction of outgoing material can cause the incoming conveyor to pack the conveyed material in the corner in an extremely dense mass that can be dislodged only with great difficulty, frequently by disassembling the parts. Various types of diaphragm pressure switches for controlling the buildup of pressure in such a corner were tried, with only partial success. The present invention offers great advantages over the prior art diaphragm pressure switches, because it not only shuts off the system electrically but relieves the pressure in the corner, preventing packing and permitting the corner to be cleaned readily so that the cause of the blockage may be ascertained. The construction is simple and trouble free and permits very positive actuation of the switch, while permitting the switch to be located in a sealed box to which the conveyed material has no access. At the same time, the switch and cover may be reset simply by closing the lid and returning the end of the spring which is attached to the cover to its former position along the slot within which it slides. Inspection of the corner is possible by opening the cover to expose it, which stops the motor.

Summary of the invention

The invention consists of providing a corner where two enclosed positive action conveyors meet with a pressure relief cover which is displaced to release material from the conveyor upon the development of excessive pressures in the material conveyed, and in arranging the means for holding the cover closed in such a manner as to provide substantial closure forces when the cover is in normal position but very much reduced or non-existent closure forces when the cover is opened. The invention further consists in a switch actuator which is unitary with the cover and which preferably is a hinge pin entering a sealed box containing this switch, and then extending at an angle to the axis of the cover hinge, to actuate the switch upon movement of the cover, the switch being connected to control at least the motor of the incoming conveyor.

Drawings

FIG. 1 is a top plan view of the device of my invention.
FIG. 2 is a side view of the device of my invention, broken away to show the interior of the switch box.

FIG. 3 is an enlarged view similar to FIG. 2 with the cover open.

Description

As shown in the drawings, my device consists of an auger 10 having an auger tube 11 which guides material conveyed by auger 10 into an auger corner housing 12. Auger corner housing 12 guides the conveyed material into auger 13 having an auger housing 14. The exact arrangements for driving the auger are not material to the invention but will include at least one power source, here designated as motor 15.

Corner housing 12 is provided with an opening 20 surrounded by a wall 21 which provides an outer edge 22 lying in a common plane to receive a relief opening cover 23 which seals the opening under normal conditions.

Directly adjacent the wall 22 is a switch housing 24 which completely encloses a switch 25. Switch 25 is of a type which may be actuated by a lever arm, or is provided with associated mechanism which adapts it for such actuation.

Relief opening cover 23 is preferably sufficiently large to cover enclosed switch housing 24. The cover is hinged at one margin on a pair of coaxial pins 26 and 27 which are fixedly secured to relief opening cover 23. Hinge pin 26 is received in a hole on the side of opening 20 remote from switch housing 24, while hinge pin 27 is journaled in an opening in switch housing 24 itself, the opening being located on the side away from opening 20 in corner housing 12. The portion of hinge pin 27 within housing 24 is bent away from the common axis of pins 26 and 27 to extend to a point adjacent to switch 25, and so related to the switch that when cover 23 is opened about hinge pins 26 and 27, the end portion 28 of hinge pin 27 strikes the switch mechanism, here represented by a lever 29 which is part of the switch, causing the normally closed contact to open.

Switch 25 may be in series with motor 15 as shown, or may operate relays or other controls such that at least the motor for the augers, and if desired the entire associated mechanism, is turned off when cover 23 opens.

Cover 23 is also provided with a slot 31 to receive one end of a spring 30. The other end of the spring 30 is anchored at a sufficient distance from slot 31 to apply tension to the cover. The parts are so related that spring 30 normally occupies the end 31' of slot 31 which is remote from the hinge pins 26 and 27, where it has substantial leverage on the cover to hold it closed. However, the shape of the slot and the location of the other end of spring 30 are such that once the cover is opened the spring 30 slides to end 31" of the slot where it has very little leverage on cover 23 and cannot close it.

In operation, when excessive pressure builds up in the corner housing and auger tube 11 for any reason, whether it be jamming of the parts, packing of the material, failure of one auger to operate, or the like, the positive action of incoming auger 10 will very quickly raise the pressure in the material to a point which will open cover 23 against the force of spring 30. Since hinge pin 27 is non-rotatably fixed to cover 23 by the pair of jam nuts 27a, end 28 of pin 27 will strike switch lever 29 and open switch 25, stopping motor 15. Cover 23 will remain open, so that motor 15 cannot be restarted, until it is manually reset, which can be done simply by closing it and by sliding spring 30 over to end 31' of slot 31, if it does not slide there by itself.

The opening of cover 23 is not merely a device for actuating switch 25 but is important in that it relieves pressure on the material being conveyed into the auger corner, thus preventing it from packing. By relieving the pressure in the auger tubes and the auger corner through opening 20, when the operator looks for the difficulty in the auger he can empty the small amount of loose material in the corner fairly readily, rather than having to dig out a solid mass. He is completely spared the task of disassembling the corner unless the difficulty which caused the pressure increase is such as to require disassembly for repairs. The mechanism is restored to operation by simply closing the cover 23 and re-setting the spring at end 31' of slot 31.

This invention has the further advantage that if it is desired to inspect the corner, the operator need merely open the cover to stop the augers. As soon as he recloses it the augers will restart.

I claim:

1. In a conveyor system, the combination of a plurality of conveyors operating within respective closed housings which meet at an angle, said conveyors being driven by a motor, with the improvement comprising a relief door adjacent said angle in said housings, said relief door being provided with variable bias means adapted to bias said door strongly toward the closed position when it is closed, said bias being substantially reduced when said door is open, and a switch, said switch being adapted to de-energize said motor in its actuated position, said cover being provided with means to actuate said switch.

2. The device of claim 1 in which the switch actuating mechanism comprises a hinge pin fixed to the cover and having a hinge portion journaled on a fixed part, and an acutator portion extending away from the axis of said hinge portion, said switch being mounted adjacent said actuator portion of said hinge pin and adapted to be actuated to a position in which the switch contacts are open when said cover is open.

3. The device of claim 1 in which said biasing means comprises a slot in said cover, one end of said spring being provided with means slidably engaged with said slot, said spring extending generally at right angles to said slot, and the other end of said spring being anchored to a fixed location, said slot having an end adjacent the hinge of said cover and an end remote from said hinge, said slot being so oriented with respect to said spring that when the cover is closed said means will occupy the end of the slot remote from said hinge whereby to apply a strong closing bias to said cover, said means being adapted to slide along said slot toward said hinge when said cover is opened, whereby to reduce the closing bias on said cover to a value which will be ineffective to reclose the cover.

4. The device of claim 1 in which the conveyors comprise augers and the housings comprise auger tubes.

5. The device of claim 1 in which the switch actuating mechanism comprises a hinge pin fixed to the cover and having a hinge portion journaled on a fixed part, and an actuator portion extending away from the axis of said hinge portion, said switch being mounted adjacent said actuator portion of said hinge pin and adapted to be actuated to a position in which the switch contacts are open when said cover is open, said biasing means comprising a slot in said cover, one end of said spring being provided with means slidably engaged with said slot, said spring extending generally at right angles to said slot, and the other end of said spring being anchored to a fixed location, said slot having an end adjacent the hinge of said cover and an end remote from said hinge, said slot being so oriented wth respect to said spring that when the cover is closed said means will occupy the end of the slot remote from said hinge whereby to apply a strong closing bias to said cover, said means being adapted to slide along said slot toward said hinge when said cover is opened, whereby to reduce the closing bias on said cover to a value which will be ineffective to reclose the cover, the conveyors comprising augers and the housings comprising auger tubes.

References Cited

UNITED STATES PATENTS

| | | | |
|---|---|---|---|
| 2,475,404 | 7/1949 | Reed | 200—61.21 |
| 2,646,476 | 7/1953 | Landry | 200—61.21 X |
| 3,272,935 | 9/1966 | Beller et al. | 200—61.7 |

ROBERT K. SCHAEFER, *Primary Examiner.*

ROBERT A. VANDERHYE, *Assistant Examiner.*

U.S. Cl. X.R.

200—61.7